United States Patent Office 3,132,931
Patented May 12, 1964

3,132,931
DRUM SIEVE DRIERS
Gerold Fleissner, Egelsbach, Frankfurt am Main, Germany, assignor to Fleissner Gesellschaft mit beschraenkter Haftung, Frankfurt am Main, Germany, a German company
Filed Dec. 13, 1960, Ser. No. 75,529
5 Claims. (Cl. 34—115)

The present invention relates to an improved drum sieve drier for drying granular and fibrous materials in mass or fleece form or flexible materials in continuous strip form in which rotary drum sieves arranged in side by side sequential relationship are provided with cover plates so that intake air can enter the drums only by way of the exposed parts of the peripheral walls thereof. Most of the known driers of the kind specified have their drum sieves arranged in two rows at different horizontal levels and the material which is to be dried, passes from a drum sieve of one row to a drum sieve of the other row, the drums being covered with the material to be dried over most of their peripheral walls—i.e., over a part of the peripheral wall of each drum sieve which subtends an angle of about 270° at the center of the drum. Such driers are not suitable for heavy-duty and rapid drying nor for drying dense and very moist material, since the speed of the air flowing through the material to be dried is limited by the risk of eddying between the drum sieves of each row and by the fact that the air must flow over a considerable portion of the peripheral wall of each drum sieve.

To prevent eddying and to increase the suction through the material to be dried, it is known to place the drum sieves in a single row, thus eliminating the gaps between the drum sieves of the same row which cause eddying and also, due to the resultant decrease in the portion of each drum sieve covered by material to be dried and through which air enters, increasing the speed at which air flows through the material. This step helped to considerably increase drying capacity and enabled higher drying temperatures to be used, with a considerable reduction in drying time. Also, single-row driers can be used to dry relatively dense material.

It is an object of this invention to further increase the performance of drum sieve driers and to adapt the same for use with even denser material requiring even greater suction.

According to the invention there is provided a drum sieve drier for drying materials in continuous mass, strip or fleece form, comprising a plurality of rotary drum sieves arranged in side by side sequential relationship, means for rotating the drums and means for creating a pressure difference between the interior and the exterior of each drum sieve, each drum sieve having associated therewith a stationary cover plate adapted to prevent passage of air through the peripheral wall of said drum sieve except at a part of said peripheral wall exposed by said cover plate which part subtends an angle at the center of said drum sieve of less than 180°.

This arrangement reduces still further the cross-section of flow of air through the material to be treated. Air speed is therefore increased, and the suction pressure is increased on a square-law basis. The capacity of a fan used to create a pressure difference between the interior and exterior of a drum sieve which depends upon drum diameter, is the same as for a drum having the same drum diameter and a larger part of its peripheral wall covered by the material. Fan speed can be increased, thus increasing air throughput and giving rise to a suction-pressure increase which is in a square-law relationship to the speed increase. The increase in suction pressure improves the adhesion of the material when passing along the lower surface of the drum sieves and insures that very dense material will stick thereto.

The invention is based on the general principle that in drying processes of the kind where air flows through the material, the size of the contact surface between the drum sieve and the material to be dried is less important than the air throughput. In driers according to the present invention air throughput can be increased although the material to be treated covers less of the peripheral wall of each drum sieve than in previously known constructions. In the construction according to the invention the gaps between the drums do not produce eddies, since the airstream flows only in straight lines within the drums and is not deflected in the same way as in the known drum sieve driers in which the material covers a considerable portion of the peripheral wall of each drum.

Driers of the kind specified can be used with advantage where the increased suction pressure is required so to retain the material in engagement with the peripheral wall of each drum sieve such that the material will not be deformed. As an example there may be mentioned the drying of veneers. The drying of veneers is often a difficult job, since due to its graining, knots and so on, timber dries non-uniformly and therefore tends to buckle. If, for instance, the air speed can be doubled while the drum surface through which the air flows is halved, the pressure difference increases, for instance, from 50 to 200 mm. water column—i.e., the material is sucked against the drum at a pressure of 200 kg./m.². This force suffices to maintain the material in firm engagement with the drum notwithstanding a different rate of drying of different portions of the material, thus obviating buckling during drying. The increased suction pressure leads to improved contact between the material and the drums, a feature of great importance more particularly in the case of material through which air cannot pass, and improves evaporation at negative pressures. However, on the positive pressure side the high kinetic energy is converted into pressure energy by the particles of air impinging on the impermeable material surface, and there is no need to provide air conveying means in the form of nozzles or the like which make access to the drier difficult. The increase in pressure—i.e., suction pressure—is therefore not lost but is used for drying.

The drier according to the invention, in which very high suctions or suction pressures can be produced, is very suitable for drying fabrics. The same are maintained in such firm engagement with the drum surface by the great suction that there is no shrinkage during drying.

Preferred embodiments of the invention will now be described with reference to the accompanying drawings in which:

FIGURE 2 is a diagrammatic view showing the drum sieve arrangement and guiding means for the material of a drum sieve drier according to the invention, while

Figure 1:
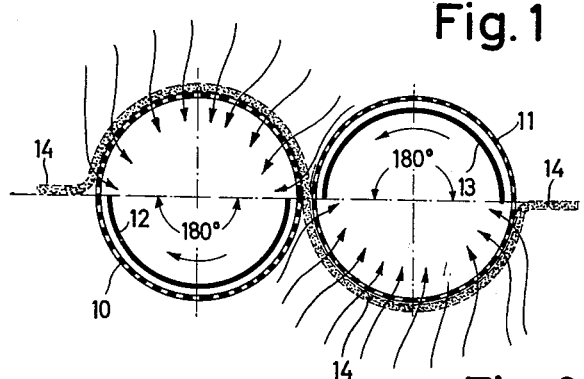
FIGURE 1 illustrates a known form of drum sieve drier.

Referring to FIGURE 1 two drum sieves 10, 11 are placed in side by side relationship with their axes of rotation in the same horizontal plane and can be followed in the horizontal direction by any number of further drums. The drum sieves are provided with internal cover plates 12, 13 for limiting air intake to the drier. Such intake is sucked out of the drums and returned thereto from the outside in a circulating stream in known manner. The air enters each drum sieve through that part of its peripheral wall exposed by the cover plate. This arrangement is already known and can be found in detail in applicant's prior U.S. Patent No. 2,950,540. A fibrous fleece 14, for example, moves over the drum 10 and under the drum 11 and, as it does so, the air entering the drums flows through it and dries it. In this construction the fleece 14 adheres to each drum over half of its periphery. The stream lines of the air are straight so that eddying cannot occur and fairly high air speeds can be used so that the drying time can be regulated and heavy materials can be dried.

Figure 2:
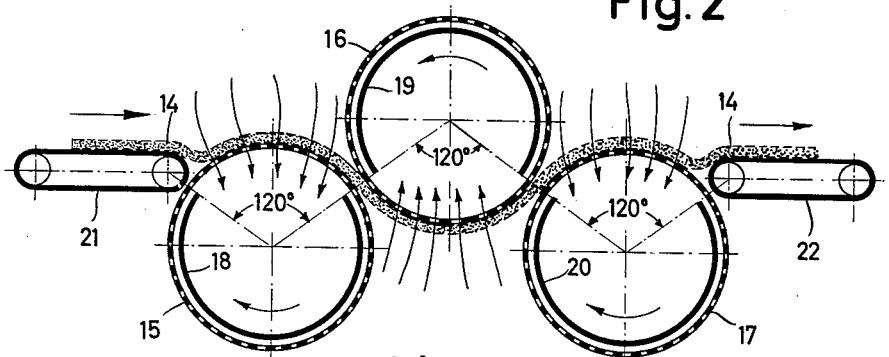

FIGURE 2 illustrates an arrangement of the drums whereby an increase in air speed is obtained. Drums 15, 16, 17 are disposed in side by side relationship with the axes of rotation of next adjacent drum sieves at different horizontal levels and the drum arrangement can be extended by additional drum sieves as required. Disposed inside the drums are stationary cover plates 18, 19, 20 which extend around approximately two-thirds of the internal peripheral wall of each drum. The fleece 14 is supplied, for instance, by a lattice belt 21 and removed by a lattice belt 22. Adjacent drums rotate in opposite directions so that the fleece 14 passes over the top of the drum 15, then below the drum 16 and then above the drum 17. The means for rotating the drums in opposite directions is well known and may take the form shown in applicant's prior U.S. Patent No. 2,950,540. The fleece 14 passes over or under only one-third of the peripheral wall of each drum, then passes to the next drum, again only to engage with one-third of the peripheral wall thereof. The main point is that the fleece engages over much less of the peripheral wall of each drum than in the arrangement shown in FIGURE 1. The drums are of substantially the same diameter as the drums shown in FIGURE 1. The drums are of the suction type and associated with each drum is a radial flow suction fan (not shown) which is placed immediately adjacent one end of the drum in known manner. Each fan is adapted in size and design to the size and design of its associated drum to ensure very high rates of air flow. The fan capacity which must be provided therefore depends upon drum diameter, since the fans associated with the various drums must be placed adjacent one another.

Since the part of the peripheral wall of each drum with which the fleece engages is much less in the arrangement shown in FIGURE 2 than in the arrangement shown in FIGURE 1, a given fan capacity, i.e., a given circulated volume of air, gives a greater air speed in the case of FIGURE 2 than in the case of FIGURE 1, since the airflow cross-section in FIGURE 2 is less than in FIGURE 1. Relatively heavy material will therefore adhere to the underpart of the drum 16 without dropping. In this arrangement fan speed can also be increased, thus increasing the volume of air, and also providing a square-law increase in suction pressure. Air throughput can therefore be increased considerably and the adhesion between the material and the drum increased. The arrangement shown in FIGURE 2 will therefore deal with denser material than the arrangement shown in FIGURE 1. Still referring to FIGURE 2, the arrangement of the drum sieves at different horizontal levels and the presence of gaps between the drums 15 and 17 does not cause any eddying as in known drum sieve driers, since the inflowing air is not deflected from its path by the drums 15 and 17 and the stream lines extend straight.

Figure 3:
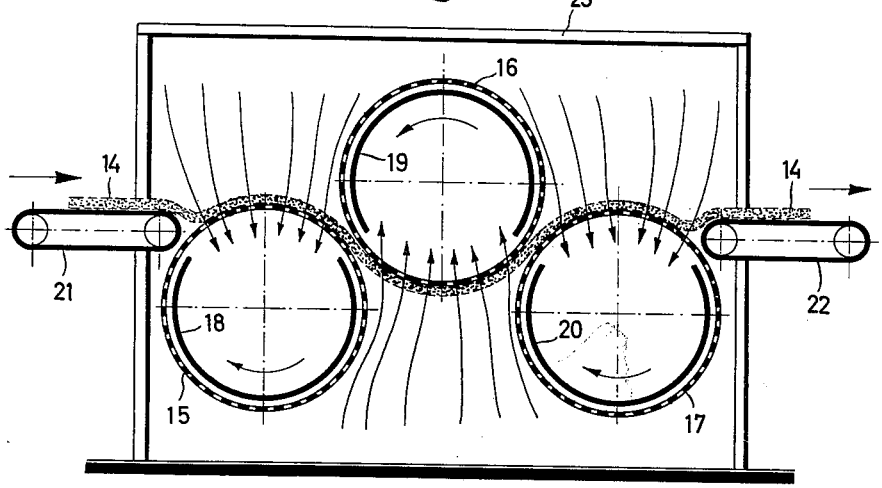
FIGURE 3 illustrates the apparatus of FIGURE 2 disposed in a casing.

FIGURE 3 illustrates the arrangement of FIGURE 2 but disposed in a casing, two drum sieves having an upper part of their peripheral walls exposed by their cover plates and the third drum having a lower part of its wall exposed for air entry.

A drum drier according to the invention will dry granular and fibrous materials; driers according to the invention can also be used with advantage wherever the material to be dried must be subjected to considerable suction to prevent buckling, as in the drying of veneers. The drying capacity of the novel drier is very high since the air throughput can be very great. The drying times of the novel drier are much shorter than the drying times of known driers.

What I claim is:
1. A drum sieve drier for drying a strip of material comprising a plurality of suction drum sieves having surfaces provided with perforations, said drum sieves being arranged in adjacent relation in alternating raised and lowered positions, adjacent drum sieves being adapted for rotation in opposite directions about respective axes extending parallel to one another, said drum sieves being each adapted for drawing air through the perforations therein under the action of suction forces developed within the respective drum sieve, and means within each drum sieve having an angular extent of 240° for blocking the passage of air through the perforation in the associated drum sieve for said angular extent to leave a remaining angular extent of 120° through which air may be drawn, said means in each drum sieve having opposite extremities, one of which lies in a plane passing through the axis of rotation of the associated drum sieve and through the axis of rotation of an adjacent drum sieve, such that adjacent sieves have respective 120° angular extents through which air may be drawn, which face in opposite directions whereby the strip of material may be advanced alternately along the upper surface of one sieve and the lower surface of the adjacent sieve, with the strip having opposite faces alternately contacting adjacent sieves along the angular extents of 120° thereof through which air may be drawn.

2. A drum sieve drier for drying a strip of material comprising a plurality of suction drum sieves having surfaces provided with perforations, said drum sieves being arranged in adjacent relation in alternating raised and lowered positions to define two rows of sieves with adjacent drum sieves being adapted for rotation in opposite directions about respective axes extending parallel to one another, said drum sieves being adapted for drawing air through the perforations therein under the action of suction forces developed within each drum, said drum sieves being arranged such that in a plane perpendicular to the longitudinal axes the center of one drum forms with the centers of adjacent drums an angle of 120° and lines joining the centers of each drum with the centers of adjacent drums define an angular extent of 120° for each drum, means for supplying said strip to said sieves such that said strip is advanced alternately along the upper surface of one sieve and the lower surface of the next adjacent sieve under the influence of the rotation of the sieves with the strip having opposite faces alternately contacting adjacent drum sieves along said angular extent of 120° thereof during advancement of said strip, and means for permitting the passage of air through each of said drum sieves for only the aforementioned angular extent of 120° thereof.

3. A drier as claimed in claim 2, wherein said rows of sieves are horizontal, and said sieves have equal diameters, the centers of adjacent sieves being spaced from one another a horizontal distance less than the diameter of a sieve and being alternately raised and lowered with respect to one another a distance greater than the radius of a sieve but less than the diameter of a sieve.

4. A drier as claimed in claim 2, wherein the means for permitting the passage of air through each drum sieve comprises a stationary circular plate extending over substantially 240°.

5. A drum sieve drier for drying a strip of material comprising at least three adjacent suction drum sieves of equal diameter having surfaces provided with perforations, and wherein adjacent sieves are adapted for rotation in opposite directions about respective longitudinal axes lying parallel to one another, two of the sieves being spaced from one another with the third sieve located midway therebetween and transversely offset with respect thereto a distance greater than the radius of a sieve and having a center in planes perpendicular to said axes defining an angle of 120° with the centers of the other two sieves, said sieves being adapted for drawing air through the perforations therein under the action of suction forces, means for supplying the strip to the upper surface of one of said two sieves to cause the strip to be advanced alternately along the upper surface of said one sieve, the lower surface of the middle sieve and the upper surface of the other of said two sieves with the strip having opposite faces alternately contacting adjacent sieves, and means within the sieves for blocking the passage of air through said perforations for a 240° angular extent which in each sieve extends from a plane containing the axes of the associated sieve and that of an adjacent sieve and wherein in adjacent sieves the respective means extend in opposite directions to define angular extents of 120° on the surfaces of the sieves which are open whereby the opposite surfaces of the strip can contact adjacent sieves along surfaces thereof subtending central angles of 120° and which have open perforations through which air may be drawn.

References Cited in the file of this patent

UNITED STATES PATENTS

| | | |
|---|---|---|
| 1,377,793 | Schwartz | May 10, 1921 |
| 2,209,760 | Berry | July 30, 1940 |
| 2,890,526 | Fleissner | June 16, 1959 |
| 2,922,229 | Kiefer | Jan. 26, 1960 |
| 2,950,540 | Fleissner | Aug. 30, 1960 |
| 3,077,037 | Fleissner | Feb. 12, 1963 |

FOREIGN PATENTS

| | | |
|---|---|---|
| 1,008,694 | Germany | May 23, 1957 |
| 1,038,517 | Germany | Sept. 11, 1958 |